(12) United States Patent
Vohra et al.

(10) Patent No.: US 8,185,658 B2
(45) Date of Patent: May 22, 2012

(54) SUPPORTING VIRTUAL PRIVATE NETWORKS USING A FIRST NETWORK TOPOLOGY FOR FORWARDING AND A SUBSET OF THE FIRST NETWORK TOPOLOGY OR A SMALLER TOPOLOGY FOR SIGNALING

(75) Inventors: Quaizar Vohra, San Jose, CA (US);
Nischal Sheth, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 12/852,225

(22) Filed: Aug. 6, 2010

(65) Prior Publication Data
US 2010/0296414 A1  Nov. 25, 2010

Related U.S. Application Data

(63) Continuation of application No. 10/419,370, filed on Apr. 21, 2003, now Pat. No. 7,792,987.

(51) Int. Cl.
*G06F 15/173* (2006.01)

(52) U.S. Cl. ........................................ 709/238; 370/252
(58) Field of Classification Search ................ 370/252, 370/392, 236.2; 709/238–242
See application file for complete search history.

(56) References Cited

U.S. PATENT DOCUMENTS

| | | | |
|---|---|---|---|
| 6,963,575 B1 * | 11/2005 | Sistanizadeh et al. | 370/404 |
| 7,046,662 B1 * | 5/2006 | Saluja et al. | 370/389 |
| 7,136,374 B1 * | 11/2006 | Kompella | 370/352 |
| 7,283,465 B2 * | 10/2007 | Zelig et al. | 370/219 |
| 2006/0092940 A1 * | 5/2006 | Ansari et al. | 370/392 |

* cited by examiner

*Primary Examiner* — Frantz Jean
(74) *Attorney, Agent, or Firm* — John C. Pokotylo; Straub & Pokotylo

(57) ABSTRACT

Virtual Private Networks (VPNs) are supported in which customers may use popular internet gateway protocol (IGPs) without the need to convert such IGPs, running on customer devices to a single protocol, such as the border gateway protocol (BGP). Scaling problems, which might otherwise occur when multiple instances of an IGP flood link state information, are avoided by using a flooding topology which is smaller than a forwarding topology. The flooding topology may be a fully connected sub-set of the forwarding topology.

18 Claims, 10 Drawing Sheets

FIGURE 8

| TUNNEL INFORMATION AS LINK STATE ADJACENCY INFORMATION | | | | |
|---|---|---|---|---|
| VR ID | INNER LABEL (TO GET TO VR) | OUTER LABEL (TO GET TO PE THAT HAS THE VR) | VIRTUAL LINK METRIC | OUT I/F |
| VR2 | LABEL VRG(PE 2) | LABEL PE2 | ⋮ | ⋮ |
| VR3 | LABEL VRG (PE 3) | LABEL PE3 | ⋮ | ⋮ |
| VR4 | LABEL VRG (PE 4) | LABEL PE4 | ⋮ | ⋮ |
| VR5 | LABEL VRG (PE 5) | LABEL PE5 | ⋮ | ⋮ |
| VR6 | LABEL VRG (PE 5) | LABEL PE5 | ⋮ | ⋮ |
| ... | ... | ... | ... | ... |
| 810 | 820 | 830 | 840 | 850 |

| FLOODING TOPOLOGY | | | |
|---|---|---|---|
| VR ID | I/F ID | VR TYPE | I/F TYPE |
| VR2 | VRG(PE 2) ID | SPOKE | NON-FLOODING |
| VR3 | VRG(PE 3) ID | HUB | FLOODING |
| VR4 | VRG(PE 4) ID | SPOKE | NON-FLOODING |
| VR5 | VRG(PE 5) ID | SPOKE | NON-FLOODING |
| ... | ... | ... | ... |
| 710 | 720 | 730 | 740 |

700

SUPPORTING VIRTUAL PRIVATE NETWORKS USING A FIRST NETWORK TOPOLOGY FOR FORWARDING AND A SUBSET OF THE FIRST NETWORK TOPOLOGY OR A SMALLER TOPOLOGY FOR SIGNALING

§0. RELATED APPLICATIONS

The present application is a continuation of U.S. patent application Ser. No. 10/419,370 (referred to as "the '370 application" and incorporated herein by reference), filed on Apr. 21, 2003 now U.S. Pat. No. 7,792,987, titled "SUPPORTING VIRTUAL PRIVATE NETWORKS USING A FIRST NETWORK TOPOLOGY FOR FORWARDING AND A SUBSET OF THE FIRST NETWORK TOPOLOGY OR A SMALLER TOPOLOGY FOR SIGNALING," and listing Quaizar Vohra and Nischal Sheth as the inventors.

§1. BACKGROUND OF THE INVENTION

§1.1 Field of the Invention

The invention concerns providing a transport network that supports virtual private networks. More specifically, the invention concerns providing a virtual private network with simplified, yet scalable, signaling.

§1.2 Related Art

The description of art in this section is not, and should not be interpreted to be, an admission that such art is prior art to the present invention.

§1.2.1 Known Private Networking Technologies

For many entities (such as businesses, universities, etc.), local area networks (LANs) suffice for intra-entity communications. Indeed, LANs are quite popular since they are relatively inexpensive to deploy, operate, and manage, and are based on mature, well-developed technology (such as Ethernet). Unfortunately, however, many entities need to communicate with their own facilities, or others, beyond their immediate location. Thus, wide area networks (WANs) are needed. Very often, entities want at least some privacy or security attached to their communications.

Dedicated WANs are typically implemented using leased lines or dedicated circuits to connect multiple sites. Customer premises equipment (CPE), such as routers or switches, connect these leased lines or dedicated circuits together to facilitate connectivity between each site of the network Unfortunately, dedicated WANs are relatively expensive and typically require the customer to have some networking expertise. Public transport networks, which are typically deployed by regional bell operating companies (RBOCs), or some other service provider, are often used to allow remote users to connect an enterprise network using the public-switched telephone network (PSTN), an integrated services digital network (or ISDN), or some other type of transport network technology. Unfortunately, however, various incompatible public transport networks have been introduced over the years in response to the perceived needs to support various applications. Administering and maintaining these separate networks is expensive for those entities providing public transport network services. Virtual private networks (VPNs) have been introduced to permit wide-area communication without the drawbacks of WANs and public transport networks. Two of the more popular ways to implement VPNs, as well as their perceived shortcomings, are introduced in §§1.2.1.1 and 1.2.1.2.

§1.2.1.1 Layer 3 VPNs and their Perceived Limitations

Layer 3 VPNs have been proposed. See, e.g., the paper E. Rosen et. al., "BGP/MPLS VPNs," *RFC* 2547, The Internet Engineering Task Force, The Internet Society (March 1999) (This paper is incorporated herein by reference and hereafter referred to as "RFC 2547"). Unfortunately, layer 3 VPNs have a number of limitations. For example, RFC 2547 contemplated that PE routers would be administered solely by the service provider, and that the customers would have no access to PE administration. (See RFC 2547, §1.2.) Since the transport network is locked into BGP, if the customer uses an interior gateway protocol (IGP) such as open shortest path first (OSPF) or intermediate system-intermediate system (IS-IS), such protocols need to be mapped or otherwise converted to BGP if routing is to take place across the customer-service provider boundary. Similarly, hacks to BGP are necessary if the customer is running multicast.

§1.2.1.2 Virtual Router-Based VPNs and their Perceived Limitations

The concept of using virtual routers (VRs) to support VPNs is addressed in the paper, Knight (Ed.), "Network based IP VPN Architecture using Virtual Routers," Internet Draft draft-ietf-ppvpn-vr-03.txt, The Internet Engineering Task Force, The Internet Society (July 2002) (This paper is incorporated herein by reference and hereafter referred to as "the VR draft"). Departing from so-called "piggyback" models such as RFC 2547, which terminate a VPN network layer at the edge of a transport network (or "backbone"), the VR draft builds a VPN service using VRs. A VR can be thought of as a subset emulation of a real router, which has exactly the same mechanisms as a physical router, and therefore inherit all existing mechanisms and tools for configuration, operation, accounting and maintenance. That is, a VR is an emulation of a physical router at software and/or hardware levels VRs have independent IP routing and forwarding tables and are isolated from each other. Within a VPN domain, a routing instance is used to distribute VPN reachability information among VR routers.

VPN members (i.e., nodes having VRs belonging to a VPN) can be "discovered" using various techniques, such as BGP for example. However, routes (or "reachability" information) are exchanged by running existing routing protocols on a per-VPN basis across the tunnels. (See, e.g., §6 of the VR draft.) Unfortunately, this later feature can lead to scalability problems. More specifically, most popular IGP routing protocols, such as OSPF and IS-IS, are so-called "link state routing" protocols. In link state routing protocols, neighbor devices are discovered, a delay or cost metric to each of the neighbor devices is determined, and this "link state" information is send to all other routers. Each router then uses this "network topology" information to determine paths, such as shortest paths or lowest cost paths, to the other routers in the network. Typically, link state information is distributed by flooding it out to all the participating neighbors. In a transport network where a PE may support multiple VPNS, each VPN may be formed by connecting all the VRs in the VPN on all participating PEs via tunnels in a full mesh. That is, each VR instance on each PE can flood link state information across all tunnels interfaced by the PE. This causes a lot of traffic over the network and therefore does not scale well to a large number of VPNs.

§1.3 Unmet Needs

Thus, an improved VPN is needed. Such a VPN should avoid the need for converting popular IGP protocols, running on customer devices, to a single protocol, such as BGP. Instead, such a VPN should allow customers to use popular IGP protocols, while avoiding scaling problems which might otherwise occur when an IGP floods link state information.

§2. SUMMARY OF THE INVENTION

The invention may be used to support VPNs in which customers may use popular IGPs without the need to convert such IGPs, running on customer devices to a single protocol, such as BGP. Scaling problems, which might otherwise occur when multiple instances of an IGP flood link state information, are avoided by using a flooding topology which is smaller than a forwarding topology. The flooding topology may be a fully connected sub-set of the forwarding topology.

§3. BRIEF DESCRIPTION OF THE DRAWINGS

FIG. 7 is an exemplary data structure, consistent with the principles of the invention, for storing flooding topology information.

FIG. 8 is an exemplary data structure, consistent with the principles of the invention, for storing tunnel information as link state adjacency information.

§4. DETAILED DESCRIPTION

Methods, apparatus and data structures consistent with the principles of the invention provide a transport network that supports the provision of VPNs. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the principles of the invention are not intended to be limited to the embodiments shown and the inventors regard their invention as principles embodied in the following disclosed methods, apparatus and data structures and any other patentable subject matter.

§4.1 EXEMPLARY ENVIRONMENT IN WHICH THE INVENTION MAY OPERATE

Figure 1:
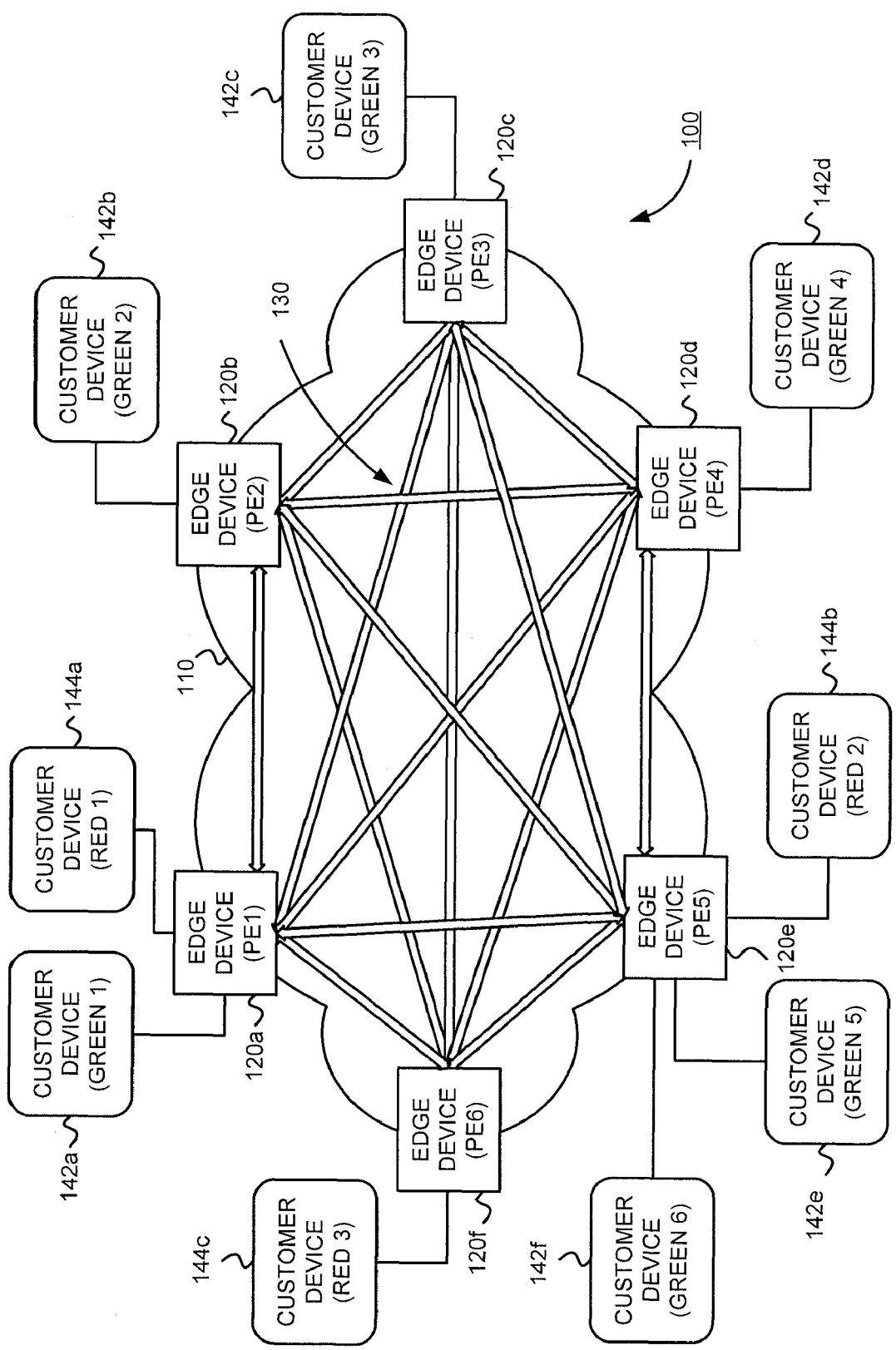
FIG. 1 illustrates an example of a VPN environment in which the invention may operate.

FIG. 1 illustrates an example of a VPN environment 100 in which the invention may operate. A transport network 110 may be accessed by one or more customers, via edge devices PE1 120a, PE2 120b, PE3 120c, PE4 120d, PE5 120e and PE6 120f (collectively, or generally referred to as "PEs 120"). PEs 120 are generally, though not necessarily, routers. PEs 120 will generally be geographically remote from one another, though this is not necessary. PEs 120 can communicate with one another via tunnels 130, such as label switched paths (LSPs). In exemplary environment 100 of FIG. 1, tunnels 130 define a "full mesh" coupling each of PEs 120. That is, a tunnel exists between each PE and every other PE in transport network 110.

Various customers can use transport network 110 so that one customer edge device (CE) can communicate with another, often remote, CE via transport network 110. Further, customer devices (referred to generally as "CE") may communicate via the customer edge devices. Although not shown, a given CE can be coupled with more than one PE. Further, multiple CEs can be coupled with a single PE. In exemplary environment 100, transport network 110 services at least two customers—customer green and customer red. More specifically, customer green has a $CE_{green1}$ 142a coupled with PE1 120a, a $CE_{green2}$ 142b coupled with PE2 120b, a $CE_{green3}$ 142c coupled with PE3 120c, a $CE_{green4}$ 142d coupled with PE4 120d, and $CE_{green5}$ 142e and $CE_{green6}$ 142f, both coupled with PE5 120e. Customer red has a $CE_{red1}$ 144a coupled with PE1 120a, a $CE_{red2}$ 144b coupled with PE5 120e, and a $CE_{red3}$ 144c coupled with PE6 120f. CEs 142/144 are generally, though not necessarily, routers. Generally, a CE can be coupled with one or more PEs via any access technology, such as point-to-point protocol (PPP), asynchronous transfer mode (ATM), Ethernet, frame relay, generic router encapsulation (GRE) tunnel, etc., for example.

Customers will almost always want their communications to be private and secure. Accordingly, it is generally required that one customer (e.g., customer green) cannot access or otherwise control the communications of another customer (e.g., customer red).

The principles of the invention may be performed in one or more VRs provided in, or used with, one or more PEs. Exemplary operations and data structures, consistent with the principles of the invention, are described in §4.2.

§4.2 EXEMPLARY APPARATUS, OPERATIONS, METHODS AND DATA STRUCTURES

§4.2.1 Exemplary Operations and Data Structures

Figure 2:
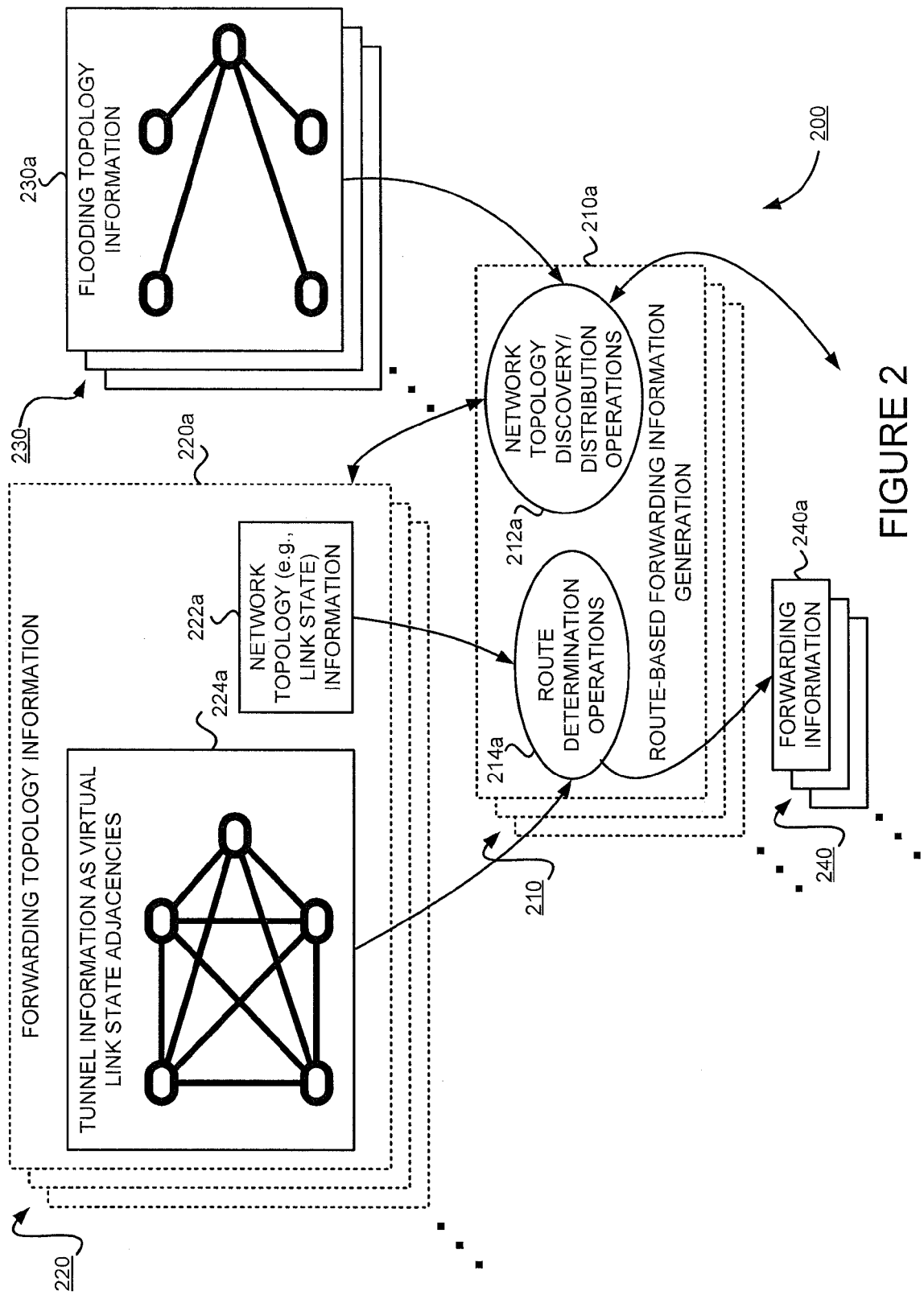
FIG. 2 is a bubble chart illustrating operations that may be effected, and information that may be stored, in a manner consistent with the principles of the invention.

FIG. 2 is a bubble chart illustrating operations that may be effected, and information that may be stored, in a manner consistent with the principles of the invention. These operations and information may be embodied by one or more VRs 200. The one or more VRs 200—one for each customer—may reside on a PE. The following describes an exemplary VR that is consistent with the principles of the invention.

As shown, there can be multiple instances 210 of route-based forwarding information generation operation—one for each VR. (Any element or elements for effecting such an operation may be referred to as a "route-based forwarding information generation facility.") A given instance of a path (or route) determination operation 210a includes a network topology discovery and distribution operations 212a and a route determination operations 214a. (Any element or elements for effecting such operations may be referred to as a "network topology discovery and distribution facility" and a "route determination facility.") Network topology discovery and distribution operations 212a can learn about and disseminate forwarding topology information 220a. For example, as is known to those skilled in the art, many popular IGPs, such as OSPF and IS-IS for example, learn about adjacent nodes as well as the cost or distance of links to those adjacent nodes. This information is commonly referred to as "link-state information" or "adjacency information." Typically, this information is then flooded (sent out over all of a node's links) to other nodes, so that each node will learn about the topology—shown as forwarding topology information 220a—of the network in which it is a part. The invention considers tunnels to be links to be advertised as link state or adjacency information. However, the invention uses a smaller topology, such as a sub-set of the tunnel topology, to disseminate tunnel "link state" information. Information about that smaller topology is referred to as flooding topology information 230a.

The flooding topology information should be "fully connected." That is, each PE should be able to reach each of the other PEs, though not necessarily directly (in one hop). For example, a hub and spoke topology may be used so that each spoke PE can reach any other spoke PE via a hub PE More than one hub PE may be defined (e.g., to increase reliability). Alternative flooding topologies are possible.

Figure 3:
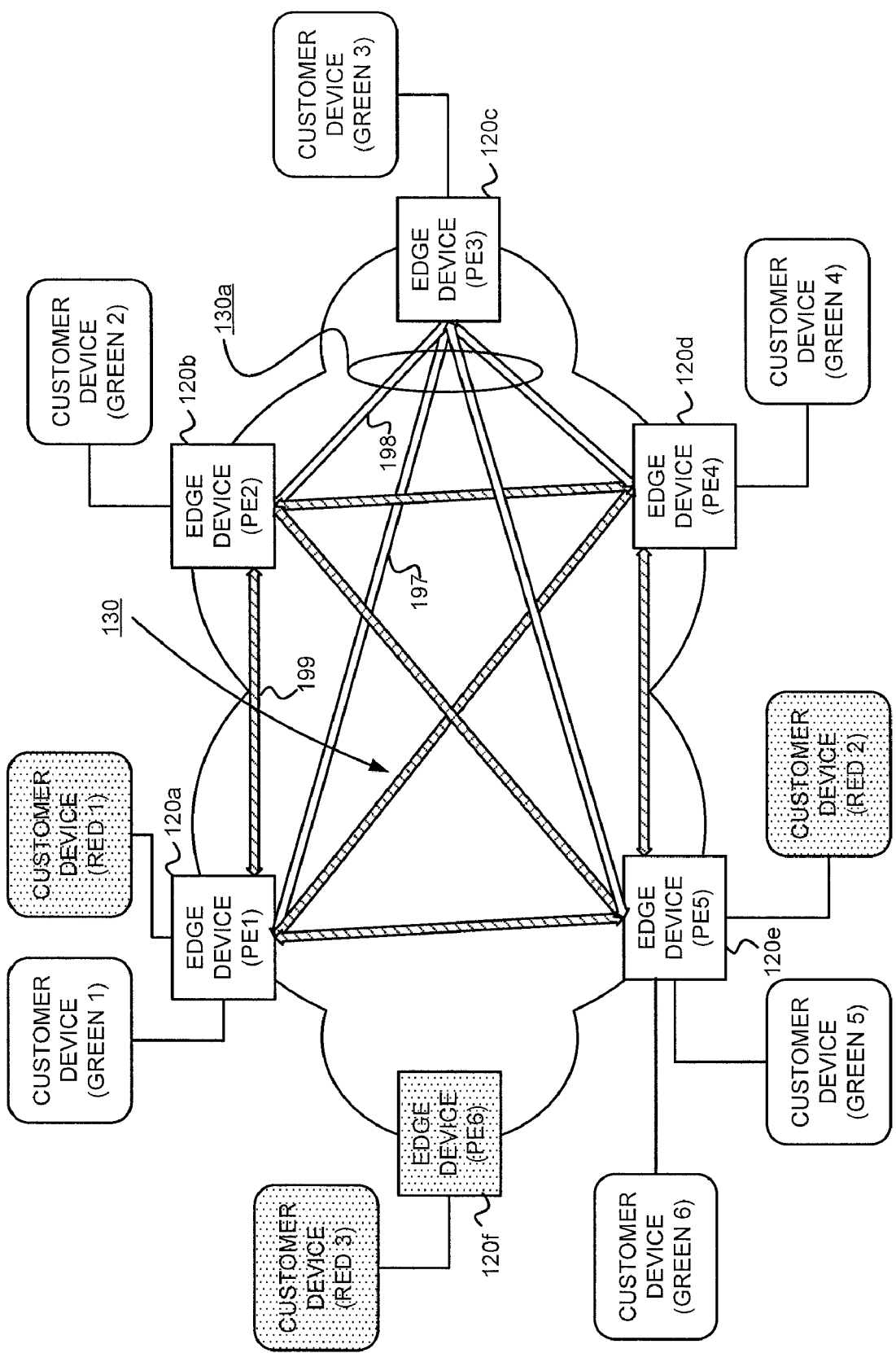
FIG. 3 illustrates a how a sub-set of tunnels of the VPN environment of FIG. 1 may be used to flood green VPN link state information.

FIG. 3 illustrates an exemplary flooding topology instance that may be used for tunnels serving customer green in the environment of FIG. 1. As shown, only a subset 130a of tunnels 130 are used for flooding purposes. As can be appreciated from FIG. 3, a green VR instance on PE3 120c is a "hub" in the flooding topology while green VR instances on PE1 120a, PE2 120b, PE4 120d and PE5 120e are "spokes" in the flooding topology. Notice that PE6 120f is not "connected" in this flooding topology instance. This is because PE6 120f does not serve any green CEs and therefore doesn't have a green VR instance. (A red VR instance on PE6 120f would be a part of another flooding topology instance—that of VPN red—connected to other red VR instances on PE1 120a and PE5 120e, for customer red's VPN).

Referring back to FIG. 2, assume now that the network topology discovery and distribution operations 212a learned about the network topology associated with customer green's VPN. This information is stored as forwarding topology information 220a. Forwarding topology information 220a may include both actual (single-hop) link adjacencies 222a, as well as tunnel "link adjacencies" 224a. A route determination operations 214a then use this forwarding topology information 220a to determine forwarding information 240a. Any route determination technique, such as Dijkstra's algorithm for example, may be used. As is known to those skilled in the art, this forwarding information 240a is used to advance addressed data (referred to as a "packet" in the specification, without loss of generality) to its ultimate destination (e.g., as defined by a layer 3 address). Here, a tunnel is treated as a virtual link, the egress node of which is treated as an adjacent node (even though one or more intervening nodes may exist). Forwarding information 240 may then be used by a packet forwarding operations (not shown) to advance inbound packets towards their ultimate destination.

As can be appreciated from the forgoing description, all tunnels of the VPN may be used for purposes of forwarding packets. However, only a smaller set, such as a subset of the tunnels, is used for flooding link state information in accordance with a routing protocol such as an IGP. Since the routing protocol used for connecting a particular customer's VRs can be the same as the routing protocol used within the customer's own private network, no special conversion need take place when the customer's routing information is distributed across the transport network. Indeed, the VR instance is seen by the customer as a part of its own network. Since the flooding topology can be limited, the invention can scale to large, dense (e.g., full mesh tunnels) VPNs.

Figure 4:
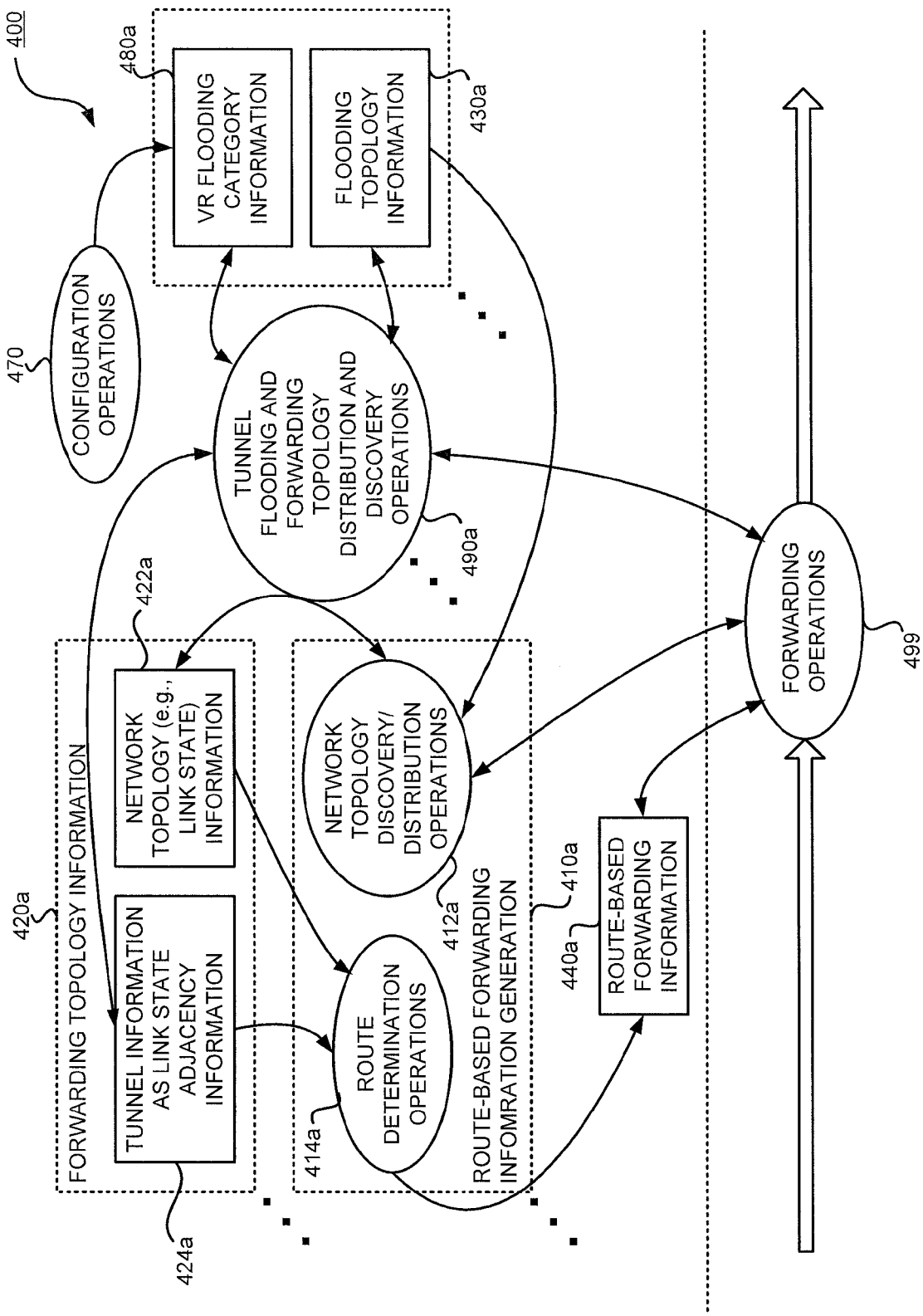
FIG. 4 is a bubble chart illustrating operations that may be effected, and information that may be stored, in a manner consistent with the principles of the invention.

FIG. 4 is a bubble diagram of a refined VR instance 400 consistent with the principles of the invention. Route-based forwarding information generation operations 410a, forwarding topology information 420a, flooding topology information 430a, and route-based forwarding information 440a may be the same as, or similar to, the corresponding operations and information of VR instance 200 described above with reference to FIG. 2, and are therefore not described again in this section. As shown, forwarding operations 499 may use the route-based forwarding information 440a to forward inbound packets towards their ultimate destination. (Any element or elements for effecting such an operation may be referred to as a "forwarding facility.") In this refined embodiment, VR flooding category information 480 is assigned to the VR instance 400, for example via configuration operations 470. If the flooding topology is to be a hub and spoke topology, VR instance 400 should be designated or otherwise identified as either a hub or a spoke. This designation can be manually configured via a user interface supported by configuration operations 470.

Still referring to FIG. 4, an instance of a tunnel flooding and forwarding topology distribution and discovery operations 490a may be provided to generate at least the flooding topology information 430a. (Any element of elements for effecting such an operation is referred to as a "tunnel flooding and forwarding topology distribution and discovery facility.") Tunnel flooding and forwarding topology distribution and discovery operations 490a may also be used to generate "virtual" link state adjacencies from the tunnel information In one embodiment consistent with the principles of the invention, the technique described in the paper, "Layer 2 VPNs Over Tunnels", draft-kompella-ppvpn-l2vpn-02.txt, Kompella et al., Internet Engineering Task Force, The Internet Society (November 2002) (This paper is incorporated herein by reference and hereafter referred to as "the Kompella L2VPN technique.") may be used to discover and distribute this information. Other discovery and distribution techniques may be used instead. In a simple embodiment consistent with the principles of the invention, such as that shown in FIG. 2, flooding topology information 230a may have been provided by any means, including manual entry, or distribution from another source, for example.

Exemplary methods for performing the operations discussed above, and exemplary data structures for storing the information discussed above, are now described in §4.2.2.

§4.2.2 EXEMPLARY METHODS AND DATA STRUCTURES

Figure 5:
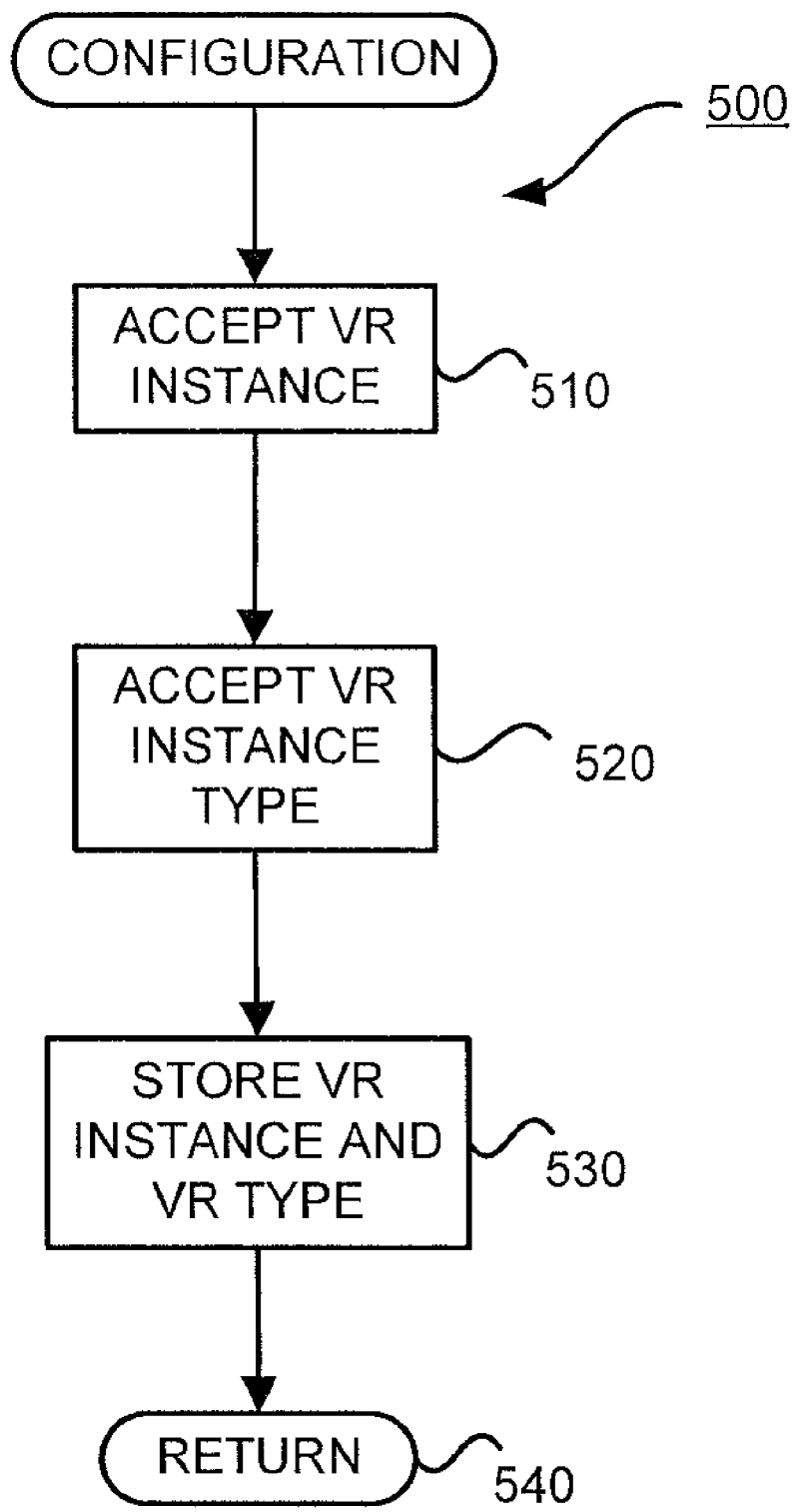
FIG. 5 is a flow diagram of an exemplary configuration method consistent with the principles of the invention.

FIG. 5 is a flow diagram of an exemplary configuration method 500 consistent with the principles of the invention. A VR instance is accepted (block 510). For example, referring to FIG. 1, PE5 120e may be provided with a green VR instance and a red VR instance. Then, a VR instance type is accepted (block 520). The VR instance type and/or other information is used to determine whether interfaces of the VR instance will flood adjacency information or not. For example, in the context of a hub and spoke flooding topology, the VR instance type can be defined as a hub or a spoke. Naturally, other VR instance types may be applicable for other flooding topologies. There are various ways of indicating a VR instance type. In one embodiment, when signaling a given VR, a BGP community indicating the VR type (e.g. hub or spoke) is carried as part of the signaling information for the VR Referring, for example, to the hub and spoke topology illustrated in FIG. 3, the green VR instance in PE3 120c is configured as a hub, while the green VR instances in PE1 120a, PE2 120b, PE4 120d and PE5 120e are configured as spokes. Referring back to FIG. 5, the VR instance and type are stored (block 530) and the method 500 is then left (node 540). One skilled in the art will appreciate that a number of alternative data structures may be used for storing the VR instance and type. For example, a VR instance type may be defined explicitly, or inferred.

Figure 6:
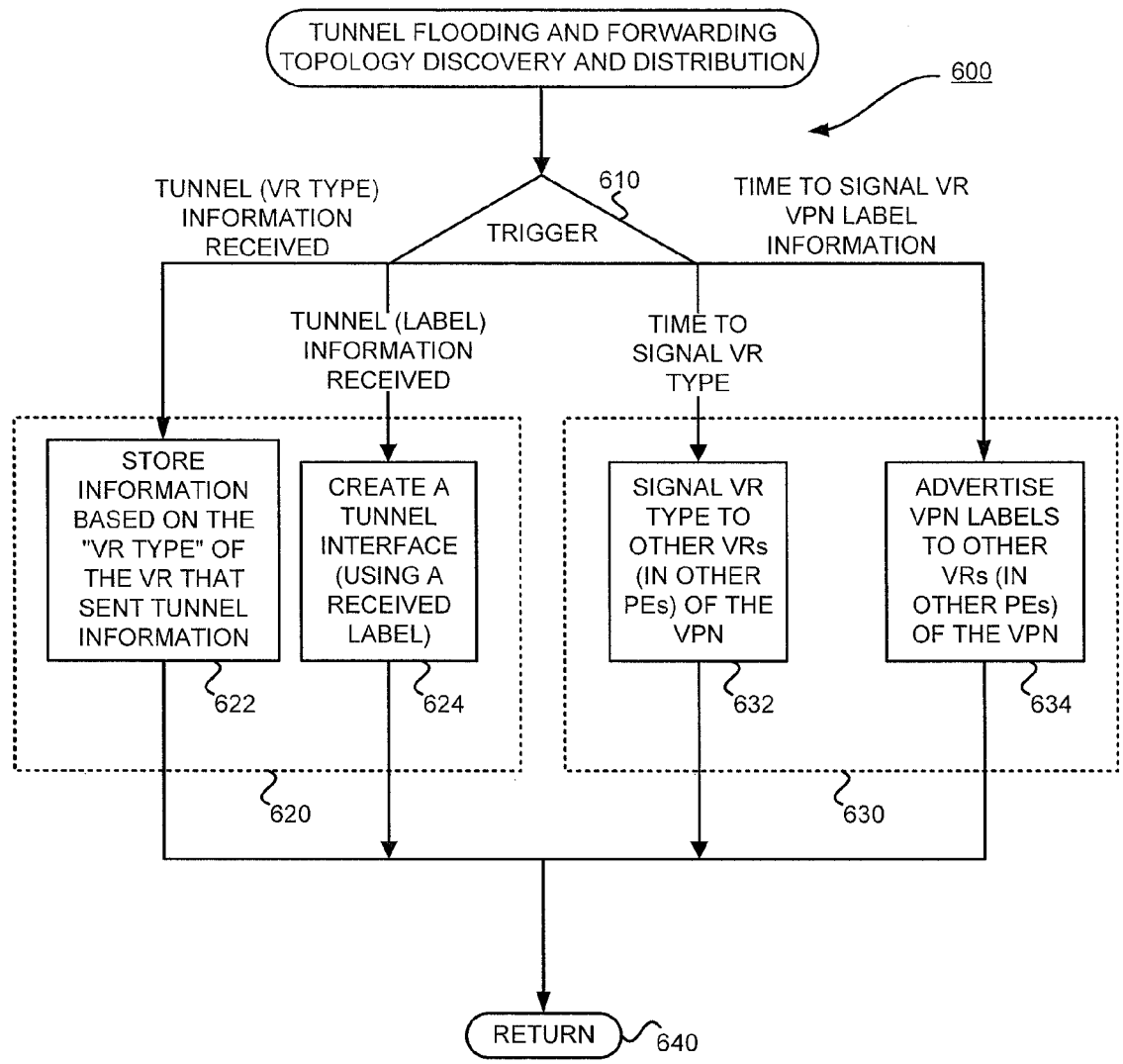
FIG. 6 is a flow diagram of an exemplary method, consistent with the principles of the invention, for discovering and distributing tunnel flooding and forwarding topologies.

At this point, a given VR instance at a given PE will have been configured. However, this VR instance needs to learn about other VR instances that belong to its VPN. FIG. 6 is a flow diagram of an exemplary method 600, consistent with the principles of the invention, for discovering and distributing tunnel flooding and forwarding topologies. As indicated by trigger event block 610, various acts of method 600 may be performed in response to various events. More specifically, if tunnel (e.g., VR type) information is received, method 600 may store information (e.g., logical interface information) based on the VR type of the VR that sent the tunnel information (block 622). FIG. 7 is an exemplary data structure 700, consistent with the principles of the invention, for storing flooding topology information. Data structure 700 may include a number of entries. An entry may include a (remote) VR identifier 710, an identifier 720 of a (tunnel) interface to the PE to which the (remote) VR belongs, a VR type 730 and an (tunnel) interface type 740 such as flooding or non-flooding. The interface type may be based on the VR type indicated in the information received, the VR type of the VR itself or both. For example, referring to FIGS. 3 and 7, a green VR instance in PE1 may include flooding topology information about the other VRs belonging to its VPN. Thus, the interface to the green VR instance on PE3 120c is type flooding, while the interfaces to the other green VR instances (on PE2 120b, PE4 120d and PE5 120e) are type non-flooding. Thus, for example, in a simple hub and spoke flooding topology, if either or both nodes associated with an interface are hubs, the interface will be type flooding. However, if both nodes associated with an interface are spokes, the interface will be type non-flooding. Naturally, the way in which the interface types are defined will depend on the flooding topology to be used.

Referring once again to trigger event block 610 of FIG. 6, if tunnel information (e.g., a label) is received, a tunnel interface using the received tunnel information is created (block 624). This may be done using the Kompella L2VPN technique. Indeed, as indicated by dashed block 620, both tunnel label and VR type information may be received together. The Kompella L2VPN technique may be used to facilitate the transfer of such information. More specifically, BGP communities may have been used to assign (e.g., mark) special attributes (e.g., hub, spoke, etc.) to VR instances. The VR receiving an advertisement can therefore determine a type associated with the VR that sent the advertisement. Further, a VR instance that receives an advertisement may use the label meant for itself (e.g., one label from a set of labels, referred to as a label-block in the Kompella L2VPN technique) to create a tunnel interface using the received label and using the VR type.

Recall that a tunnel interface may be created in response to receiving tunnel (label) information (block 624). FIG. 8 is an exemplary data structure 800, consistent with the principles of the invention, for storing tunnel information as link state adjacency information. As shown, the data structure 800 may include a number of entries. Each entry may include an identifier 810 of the remote VR to which the tunnel represented by each row goes to (or, alternatively, the PE address of the remote PE on which the remote VR is located). Each entry may also include an inner label 820. Such an inner label 820 may be used by an egress PE to determine an appropriate VR (residing on the PE) which will further forward a packet towards a destination CE. Each entry may also include an outer label 830. Such an outer label 830 may be used to properly forward addressed data towards an egress PE that includes the "next hop" (where the tunnel is considered one hop) VR. Each entry may also include a virtual link metric. The virtual link metric may provide an indication of a cost associated with the virtual link to be used by a routing algorithm. The cost may be a function of one or more factors, such as number of hops, delay, bandwidth, services supported, etc. If it is desired to force the routing algorithm to choose the virtual link, or at least to favor the virtual link, the virtual link metric may set to, or otherwise default to, a relatively low cost value. Finally, each entry of the data structure 800 may include an outgoing interface 850 associated with (e g., that terminates) the tunnel.

Referring to both FIGS. 7 and 8, the I/F type information 740 stored in 700 may instead be stored in tunnel information 800 in association with an interface.

Referring once again to trigger event block 610, if it is time to signal the type of the VR instance running method 600, the VR instance signals its type (e.g., hub or spoke) to other VR instances of the VPN (block 632). The other VR instances of the VPN may be located on other PEs Similarly, if it is time to signal label information associated with the VR instance running method 600, this label information may be advertised (sent) to other VR instances of the VPN (block 634). This may be done using, for example, the Kompella L2VPN technique. Indeed, as indicated by dashed block 630, both label and type information of the VR instance may be advertised together. The Kompella L2VPN may be used to facilitate the advertisement of such information. More specifically, BGP communities may be used to assign a special attribute (e.g., hub, spoke, etc.) to a VR instance. Further, a VR instance may advertise a set of labels to be used by other VRs of the VPN to create a tunnel interface to it.

At this point, the VR instance of a VPN may be configured with a type (hub or spoke) and may include information about (interfaces with) other VR instances belonging to its VPN. Consistent with the principles of the invention, the VR instance can use a standard IGP for network topology discovery. Most popular IGPs exchange link state information. The tunnels are treated as "virtual link state adjacencies". However, the invention limits flooding of link state information over these virtual link state adjacencies.

Figure 9:
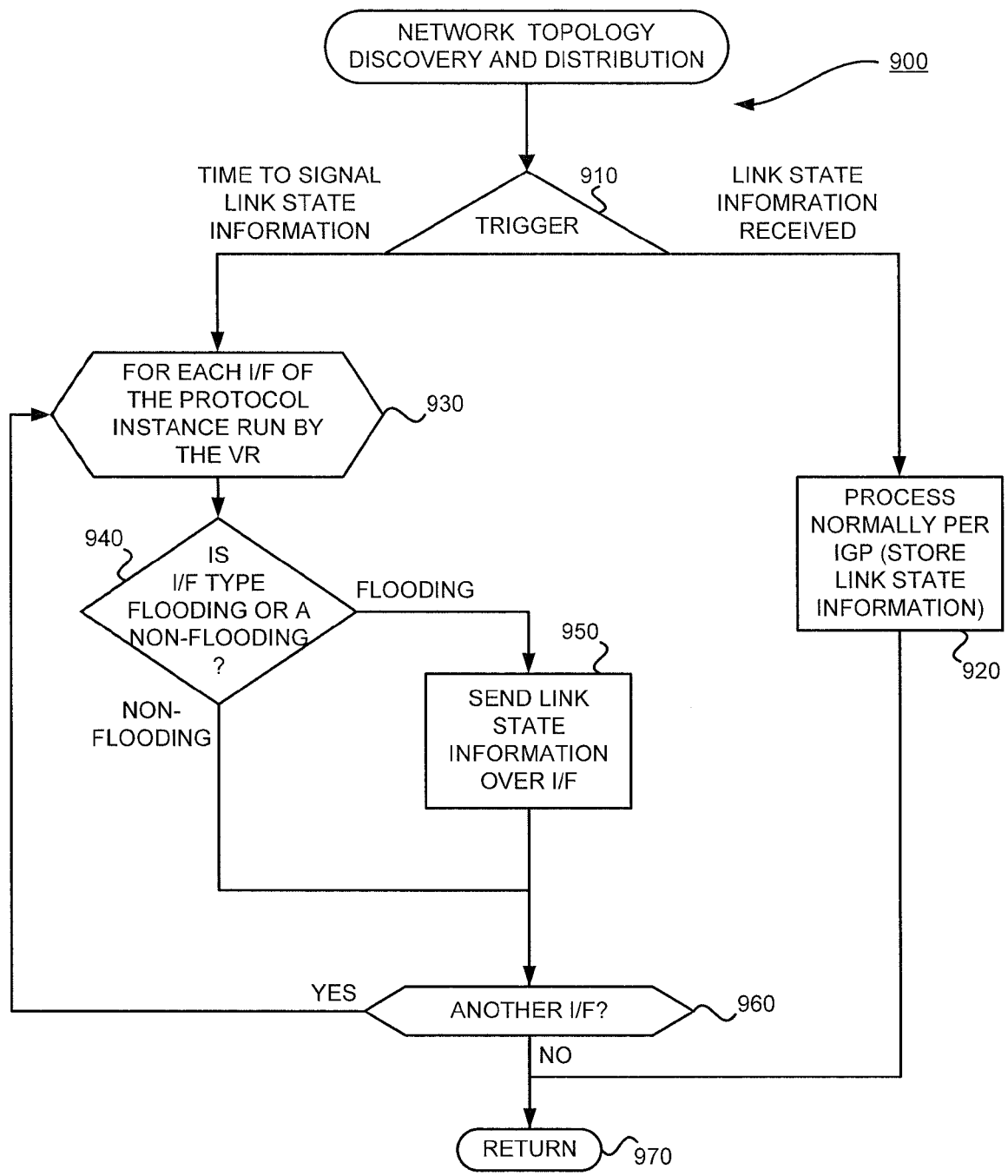
FIG. 9 is a flow diagram of an exemplary method, consistent with the principles of the invention, for discovering and distributing network topology information, such as link state information.

FIG. 9 is a flow diagram of an exemplary method 900, consistent with the principles of the invention, for discovering and distributing network topology information, such as link state information As indicated by trigger event block 910, various acts of method 900 may be performed in response to various events. More specifically, if link state information is received, it is processed normally per the IGP being run by the VR instance (block 920). Such normal processing may include storing link state information. Block 624 of FIG. 6 is similar to this step, but it creates virtual link state adjacencies associated with tunnels, rather than actual link state adjacencies. Method 900 is then left (node 970).

Referring back to trigger event block 910, if it is time to signal link state information (e.g., per the IGP being run by the VR instance), a number of acts are performed for each interface (of the IGP instance run by the VR), as indicated by the loop defined by blocks 930 and 960. More specifically, the VR instance determines the interface type (e.g., flooding or non-flooding) (decision block 940). Recall that this may have been determined previously. If the interface is type flooding, it sends link state information (e.g., all VPN topology known to the VR) to the remote VR if the interface is a tunnel, or to the actual router if the interface is real (block 950), before method 900 is left (node 970). If, on the other hand, the interface type is non-flooding, it does nothing.

As the VR instance learns of other VRs and routers belonging to its VPN, as well as state information of actual links to the other routers and virtual links (or tunnels) to the other VR instances, it will be able to compute routes based on this link state information. The VR instance may use any routing algorithm, such as Dijkstra's algorithm for example, to determine forwarding information to be used by the VR instance.

Figures 10, 11:
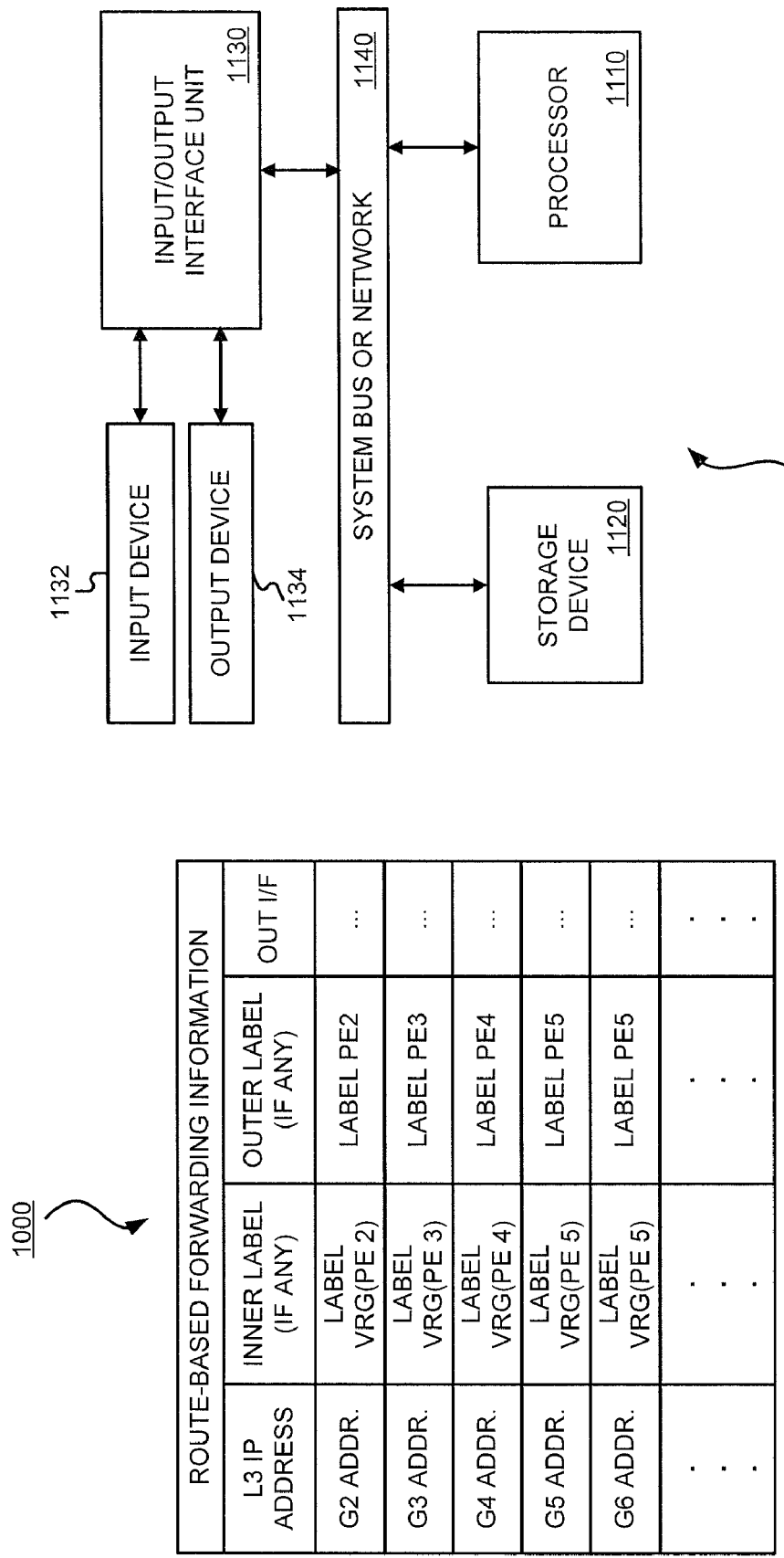
FIG. 10 is an exemplary data structure, consistent with the principles of the invention, for storing route-based forwarding information.
FIG. 11 is high-level block diagram of a machine, consistent with the principles of the invention, which may effect one or more of the operations and/or store one or more of the sets of information associated with the present invention.

FIG. 10 is an exemplary data structure 1000, consistent with the principles of the invention, for storing route-based forwarding information. Although non-tunnel routing information may be stored as well, it is not shown in FIG. 10. As shown, data structure 1000 may include a number of entries. An entry may include a layer 3 (e.g., IP) address 1010, or a portion thereof, which is used by the VR instance to forward addressed data to its ultimate destination. An entry may also include inner and outer label pairs 1020 and 1030. As is understood in the art and introduced above, the outer label 1030 may be used to forward the addressed data to an egress PE that includes a "next hop" (where a tunnel is considered to be one hop) VR. The inner label 1020 may be used by the egress PE to determine the proper VR. That is, the inner label may identify a remote routing instance in the VPN, at the egress PE. An entry may also include an output interface 1040, over which to forward addressed data. An entry of the information 1000 corresponding to an actual link may include conventional information, such as a layer 3 address (not shown) and an out interface, for example. In one embodiment, a layer 3 IP address 1010 is simply associated with a virtual interface, which includes an out interface and labels.

§4.2.3 EXEMPLARY APPARATUS

FIG. 11 is high-level block diagram of a machine 1100, consistent with the principles of the invention, that may effect one or more of the operations and/or store one or more of the sets of information discussed above. Machine 1100 basically includes a processor 1110, an input/output interface unit 1130, a storage device 1120, and a system bus and/or a network 1140 for facilitating the communication of information among the coupled elements. An input device 1132 and an output device 1134 may be coupled with input/output interface 1130. Operations of the invention may be effected by processor 1110 executing instructions. The instructions may be stored in a storage device 1120 and/or received via the input/output interface 1130. The instructions may be functionally grouped into processing modules. Although not shown, more than one of some or all of these components may be provided.

Machine 1100 may be a router for example In an exemplary router, processor 1110 may include a microprocessor, a network processor, and/or (e.g., custom) integrated circuit. In the exemplary router, storage device 1120 may include ROM, RAM, SDRAM, SRAM, SSRAM, DRAM, flash drive, hard disk drive, and/or flash card. At least some of storage device 1120 may include program instructions defining an operating system, a protocol daemon, and/or other daemons. In one embodiment, the methods consistent with the principles of the invention may be effected by a microprocessor executing stored program instructions (e.g., defining a part of the protocol daemon). At least a portion of the machine executable instructions may be stored (temporarily or more permanently) on storage device 1120 and/or may be received from an external source via input/output interface unit 1130. Finally, in the exemplary router, input/output interface unit 1130, input device 1132, and output device 1134 may include interfaces to terminate communications links.

Naturally, the operations of the invention may be effected on systems other than routers Such other systems may employ different hardware and/or software.

§4.3 EXEMPLARY OPERATIONS

Referring back to FIG. 3, a simple example illustrating exemplary discovery and forwarding operations, consistent with the principles of the invention, is now described. When a green VR instance on PE1 has link state information to flood, in addition to actual links, it only uses tunnel 197 to a green VR instance on PE3. The green VR instance on PE3 then floods this link state information to the other green VR instances (such as the green VR instance on PE2 for example). However, if the $CE_{green\ 1}$ associated with PE1 wants to send packets (e.g., a packet) to $CE_{green\ 2}$ associated with PE2, the green VR instance on PE1 may use the direct tunnel 199 to forward the addressed data towards its destination. Thus, link state information from PE1 reaches PE2 using tunnels 197 and 198, while packets may be forwarded directly from PE1 to PE2 using tunnel 199. To reiterate, the invention can use a larger set of (e.g., all) tunnels for forwarding, but uses a smaller set (e.g., a sub-set of the larger set) of tunnels for flooding link state information.

Figure 12A:
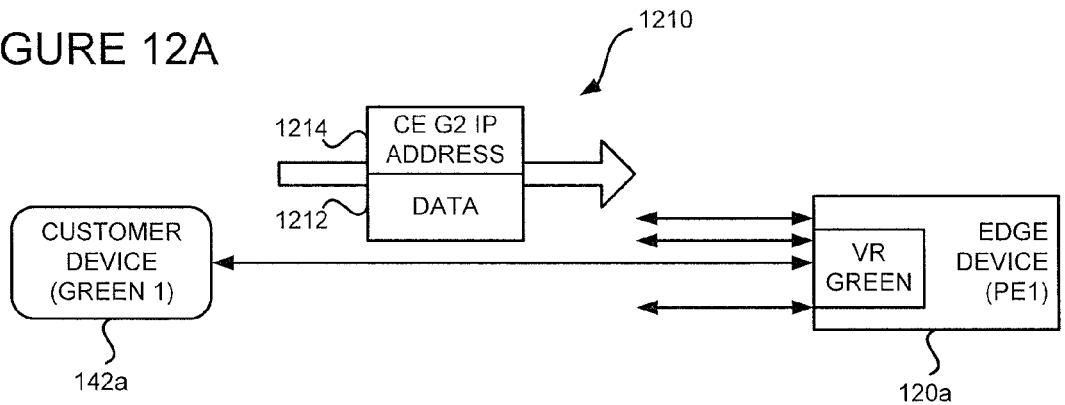
FIGS. 12A-12C illustrate an example of packet forwarding in the VPN environment of FIG. 1.
Figure 12B:
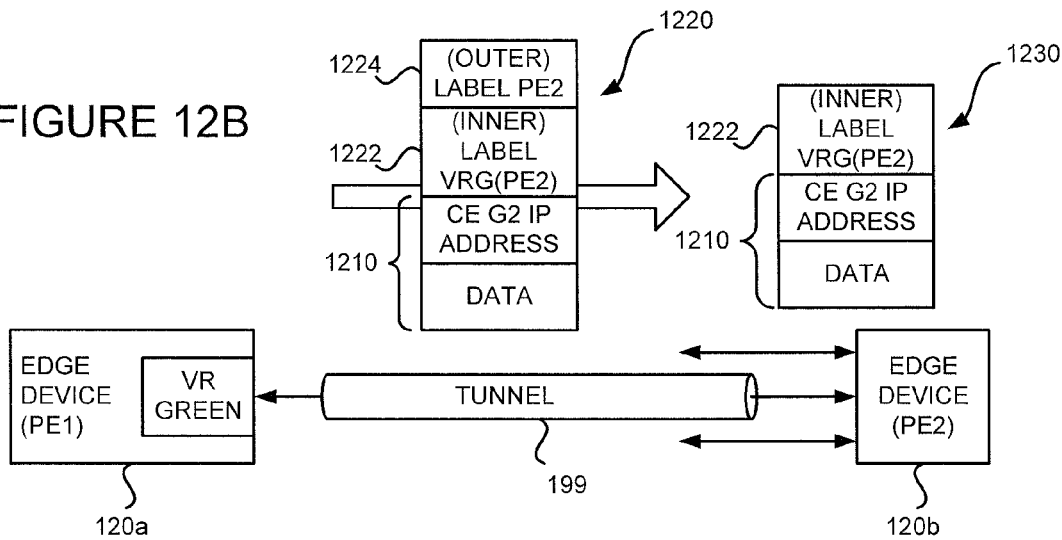
Figure 12C:
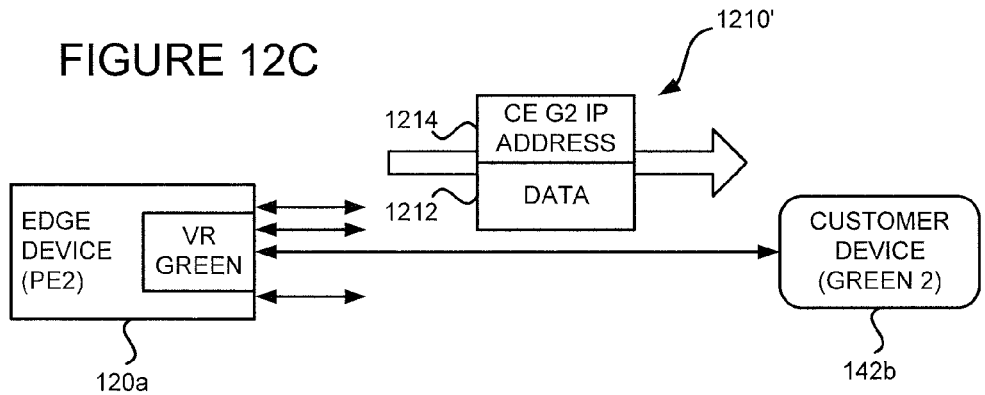

FIGS. 12A-12C illustrate an example of packet forwarding in the VPN environment of FIG. 1. As shown in FIG. 12A, $CE_{green\ 1}$ forwards packet 1210 to PE1 120a over any type of link. Packet 1210 may include data 1212 and an destination address defined by the IP address of $CE_{green\ 2}$. As shown in FIG. 12B, PE1 120a encapsulates the addressed data with stacked labels—inner label VRG (PE2) 1222 and outer label PE2 1224. A destination IP address (or a portion thereof) may be used to look up inner and outer labels. These labels may have been provided via prior signaling, such as via the Kompella L2VPN technique.) The resulting encapsulated packet 1220 is sent over tunnel 199. The tunnel 199 may be terminated by the outgoing interface of PE1 120a. Although the invention is shown supporting tunnels using stacked labels, it may be used to support any type of tunnel and is not limited to the example shown. As is known, tunnel 199 may or may not include intermediate nodes, such as transit label-switching routers for example. At egress PE2 120b, or at a node (commonly referred to as a "penultimate node") just before the egress PE2 120b, the outer label is popped (i.e., removed). As shown, the resulting information 1230 includes the packet 1210 with the inner label VRG (PE2) 1222. Finally, referring to FIG. 12C, at egress PE2 120b, the inner label 1222 is used to determine a VR to further advance the packet, and then removed. The VR will then determine an appropriate link to advance the packet towards $CE_{green\ 2}$ 142b. Thus, the final packet 1210' has the same or similar information as the address data 1210.

§4.4 CONCLUSIONS

As can be appreciated from the foregoing detailed description, the invention facilitates VPNs and avoids the need for converting popular IGPs running on customer devices, to a single protocol, such as BGP. Instead, the invention allows customers to use popular IGPs, while avoiding scaling problems which might otherwise occur when multiple instances of an IGP flood link state information.

Although the invention is described in the context of a hub and spoke flooding topology, in which VR types were simply hub and spoke, and interface type could be determined simply from the VR types of the VRs associated with the interface, the invention is not limited to that described explicitly. Rather, it is understood that the invention may be used with other flooding topologies, including arbitrary topologies. Once a flooding topology is determined, whether an interface type is flooding or non-flooding could be determined easily. VR types could be used in such a determination, though such use is not necessary under the principles of the invention. Moreover, different VR types could be defined in the context of different flooding topologies. The flooding topology need not be predetermined—so long as the VR nodes are connected in the flooding topology. Finally, although the invention was described in the context of VRs, the principles of the invention may be applied to physical routers, as well. For example, a single system unit may incorporate multiple physical routers. Accordingly, the principles of the invention can be applied to devices including one or more physical routers, one or more virtual routers, or any combination of the foregoing.

What is claimed is:

1. A method, for use with a router belonging to a virtual private network, for determining a topology for flooding network state information, the method comprising:
   a) distributing, by the router, to other nodes of the virtual private network, a type of the router in a context of the topology for flooding, wherein routers of a first type flood topology information but routers of a second type do not flood topology information;
   b) receiving, by the router, a type of at least some of the other nodes of the virtual private network in the context of the topology for flooding; and
   c) storing, by the router, information based on the received type of each of at least some of the other nodes of the virtual private network.

2. The method of claim 1 wherein the type of router is a special attribute assigned by a border gateway protocol community.

3. The method of claim 1 wherein the routers are virtual router instances.

4. The method of claim 1 wherein the routers are physical router instances.

5. The method of claim 1 wherein the routers are selected from a group consisting of:
   a) virtual router instances; and
   b) physical routers.

6. The method of claim 1 wherein the first type is a hub and the second type is a spoke.

7. The method of claim 1 wherein the information stored based on the received type of each of at least some of the other nodes of the virtual private network includes, in association with the received type of each of the at least some of the other nodes of the virtual private network, a virtual router identifier of the other node.

8. The method of claim 1 wherein the information stored based on the received type of each of at least some of the other nodes of the virtual private network includes, in association with the received type of each of the at least some of the other nodes of the virtual private network, an interface identifier of the other node.

9. The method of claim 1 wherein the information stored based on the received type of each of at least some of the other nodes of the virtual private network includes, in association with the received type of each of the at least some of the other nodes of the virtual private network, an interface identifier and an interface type of the other node.

10. For use in router belonging to a virtual private network, a tunnel flooding and forwarding topology distribution and discovery module for determining a topology for flooding network state information comprising:
    a) an output for distributing, by the router, to other nodes of the virtual private network, a type of the router in the context of the topology for flooding, wherein routers of a first type flood topology information but routers of a second type do not flood topology information;
    b) an input for receiving, by the router, a type of at least some of the other nodes of the virtual private network in the context of the topology for flooding; and
    c) a storage device for storing, by the router, information based on the received type of each of at least some of the other nodes of the virtual private network.

11. The apparatus of claim 10 wherein the type of router is a special attribute assigned by a border gateway protocol community.

12. The apparatus of claim 10 wherein the routers are virtual router instances.

13. The apparatus of claim 10 wherein the routers are physical router instances.

14. The apparatus of claim 10 wherein the routers are selected from a group consisting of:
    a) virtual router instances; and
    b) physical routers.

15. The apparatus of claim 10 wherein the first type is a hub and the second type is a spoke.

16. The apparatus of claim 10 wherein the information stored based on the received type of each of at least some of the other nodes of the virtual private network includes, in association with the received type of each of the at least some of the other nodes of the virtual private network, a virtual router identifier of the other node.

17. The apparatus of claim 10 wherein the information stored based on the received type of each of at least some of the other nodes of the virtual private network includes, in association with the received type of each of the at least some of the other nodes of the virtual private network, an interface identifier of the other node.

18. The apparatus of claim 10 wherein the information stored based on the received type of each of at least some of the other nodes of the virtual private network includes, in association with the received type of each of the at least some of the other nodes of the virtual private network, an interface identifier and an interface type of the other node.

* * * * *